United States Patent [19]

Sandell et al.

[11] Patent Number: 4,945,530
[45] Date of Patent: * Jul. 31, 1990

[54] CARTRIDGE FOR OPTICAL DATA DISCS

[75] Inventors: Patrick B. Sandell, Bartlett; Albert Ditzig, Hoffman Estates, both of Ill.

[73] Assignee: Opticord, Inc., Chicago, Ill.

[*] Notice: The portion of the term of this patent subsequent to Mar. 13, 2007 has been disclaimed.

[21] Appl. No.: 268,075

[22] Filed: Nov. 7, 1988

Related U.S. Application Data

[60] Division of Ser. No. 120,614, Nov. 13, 1987, Pat. No. 4,908,817, which is a continuation-in-part of Ser. No. 930,874, Nov. 14, 1986, abandoned.

[51] Int. Cl.$^5$ .......................... G11B 25/04; G11B 7/00
[52] U.S. Cl. .................................... 369/291; 369/273; 369/77.2; 360/133; 206/444
[58] Field of Search ................. 369/291, 229, 77.2; 360/133; 206/312, 444

[56] References Cited

U.S. PATENT DOCUMENTS

| | | | |
|---|---|---|---|
| 4,481,552 | 11/1984 | Dona et al. | 360/133 |
| 4,536,812 | 8/1985 | Oishi et al. | 360/133 |
| 4,589,105 | 5/1986 | Nemoto et al. | 369/291 |
| 4,613,044 | 9/1986 | Saito et al. | 360/133 |
| 4,660,118 | 4/1987 | Faber | 206/444 |
| 4,680,662 | 7/1987 | Fukushima et al. | 369/291 |
| 4,682,322 | 7/1987 | Ohta | 369/77.2 |
| 4,688,206 | 8/1987 | Nakagawa et al. | 369/291 |
| 4,692,831 | 9/1987 | Suzuki | 360/133 |
| 4,740,949 | 4/1988 | Davis | 369/291 |

FOREIGN PATENT DOCUMENTS

| | | | |
|---|---|---|---|
| 201870 | 11/1986 | European Pat. Off. | 360/133 |
| 61-255571 | 11/1986 | Japan | 360/133 |

Primary Examiner—Stuart S. Levy
Assistant Examiner—Kenneth B. Wells
Attorney, Agent, or Firm—Leydig, Voit & Mayer

[57] ABSTRACT

An optical data disc is enclosed in a protective cartridge including a pair of interlocking plastic shells. The shells have integral resilient fastening hooks which are locked by plugs to prevent disassembly. A two-piece sliding door is opened for exposing the disc during a read operation. In one embodiment, the sliding door includes two metal shutters having forward portions stamped with resilient hooks which are permanently retained in an undercut groove formed in a plastic slider engaged in a track defined by two plastic shells. The rear portions of the metal shutters are overlapped by respective shutter retainer strips secured to ledges formed in the shells. The door is urged towards a closed position by a double coil torsion spring providing a substantially constant closing force along the range of travel of the slider. A pivot having detent positions is provided for selectible blocking of a write protect hole formed through the shells. An alternative embodiment of sliding door is disclosed which comprises two molded plastic shutters that each have an integrally formed slider which are adapted for innerfitting engagement and for supporting the door for sliding movement relative to the cartridge shells. A locking lever also is disclosed for engaging the disc in response to movement of the door to a closed position for retaining the disc against movement during periods of non-use of the cartridge.

14 Claims, 5 Drawing Sheets

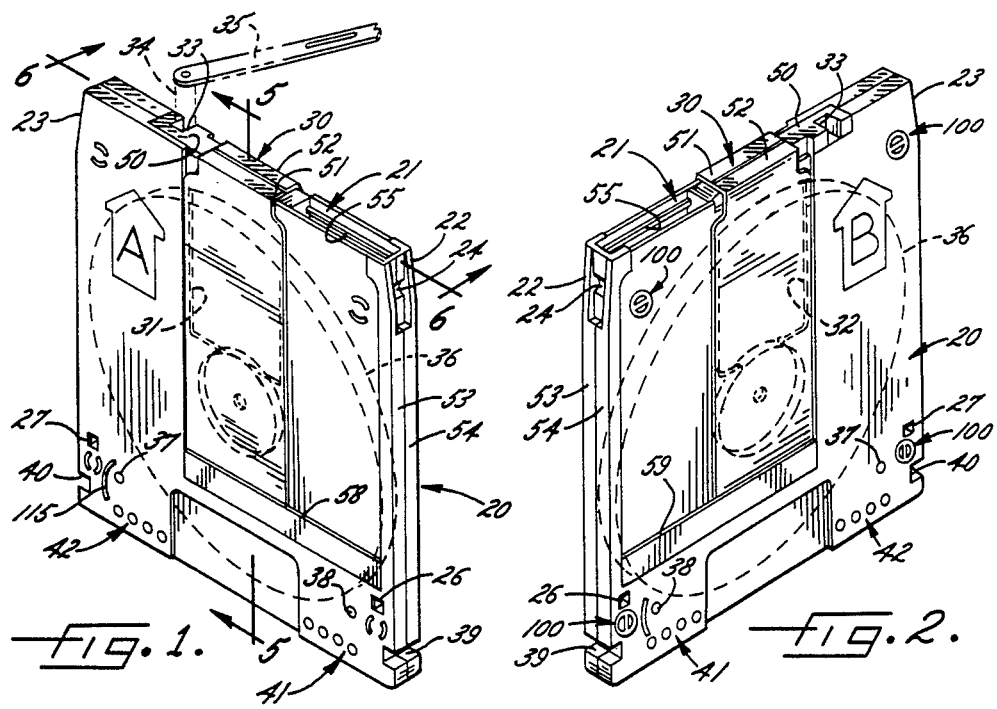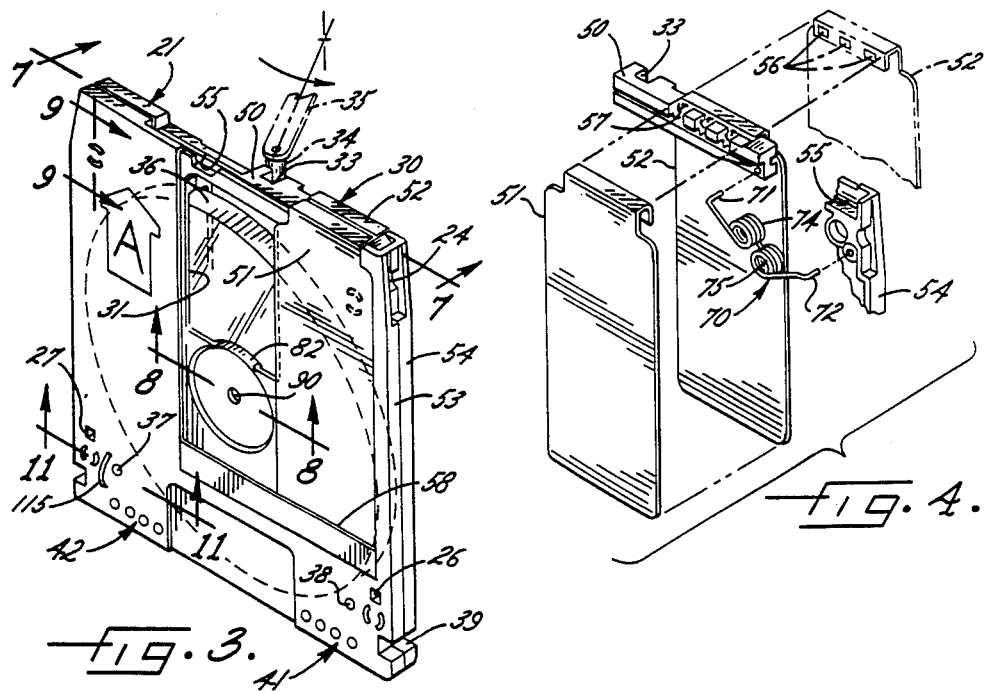

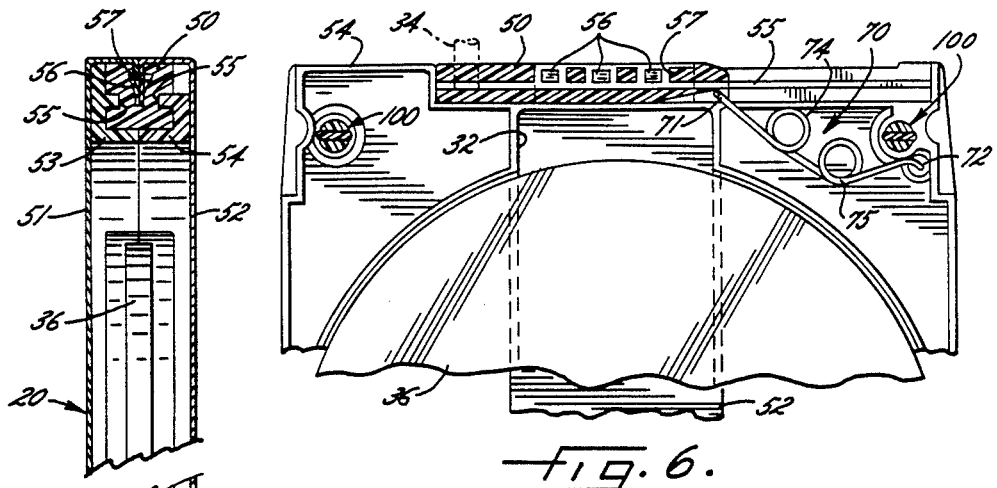
fig. 6.
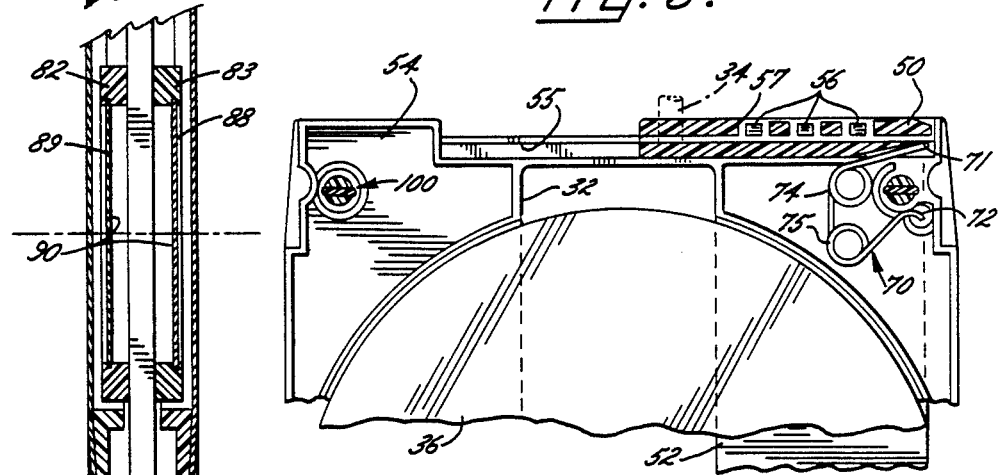
fig. 7.
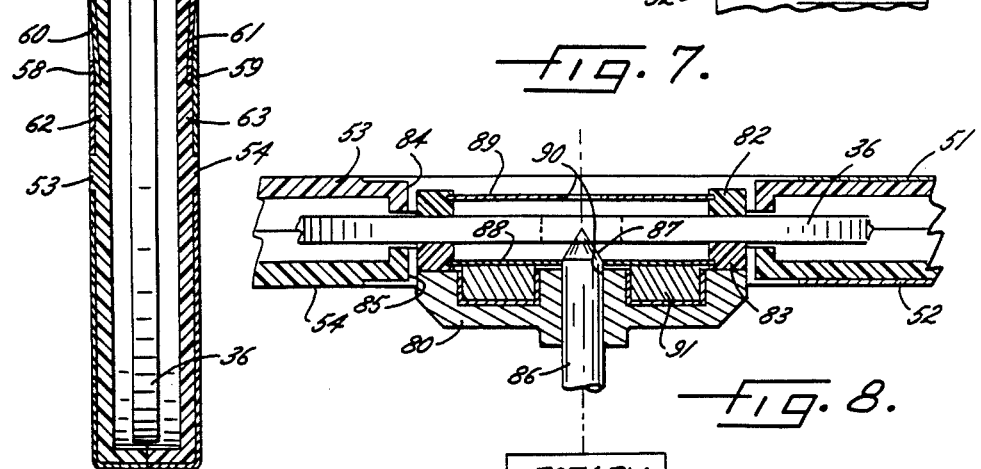
fig. 5.
fig. 8.
ROTARY DRIVE

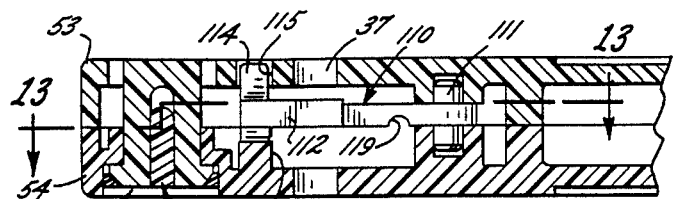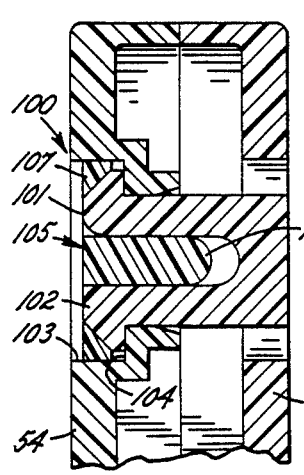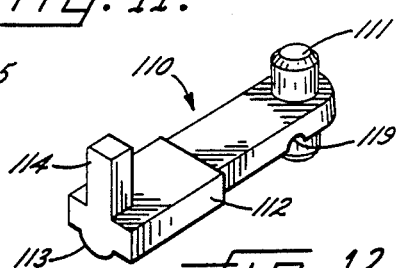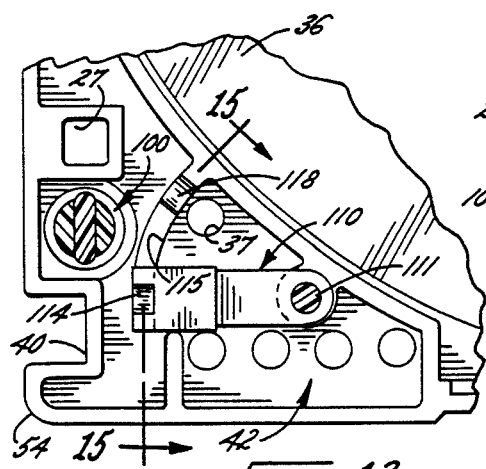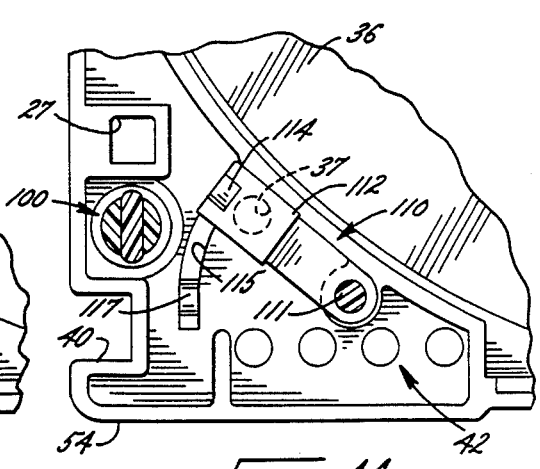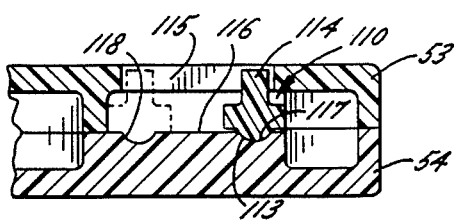

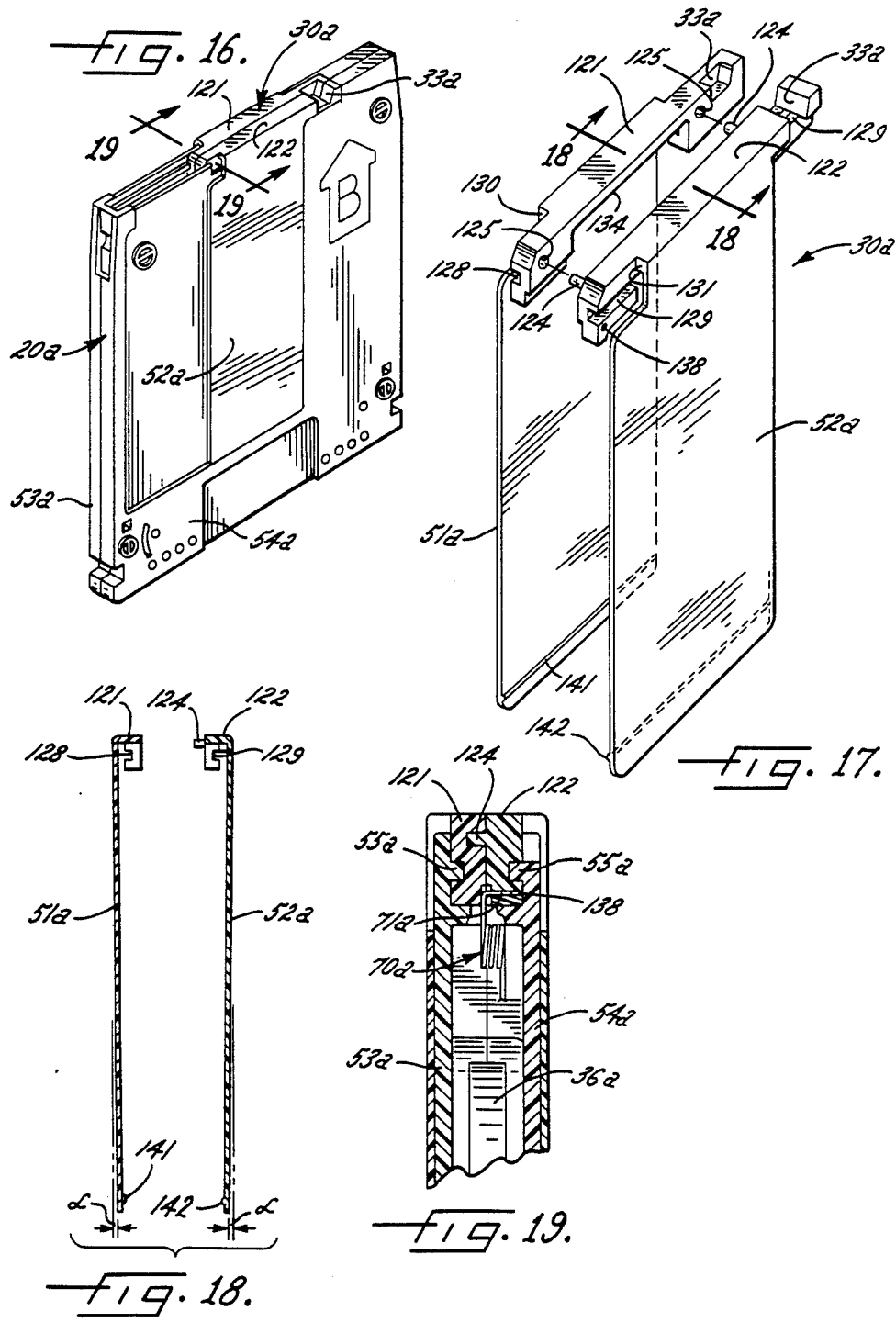

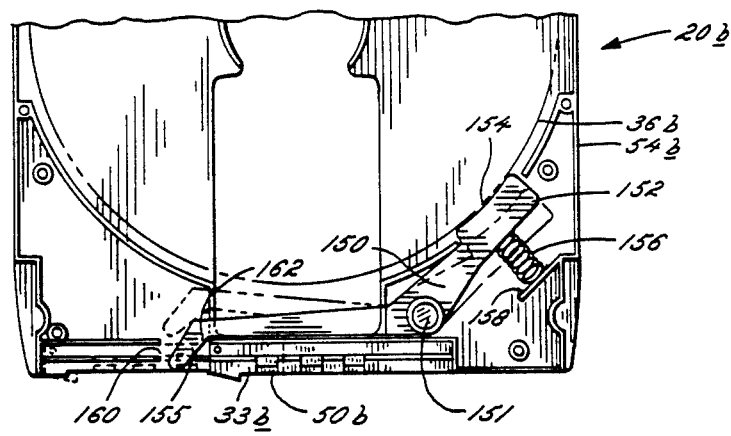
Fig. 20.
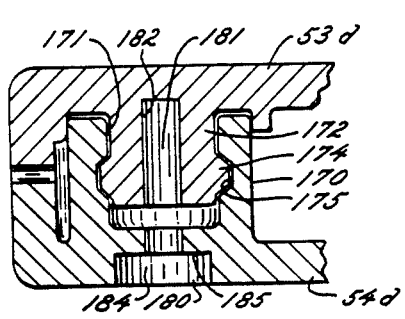
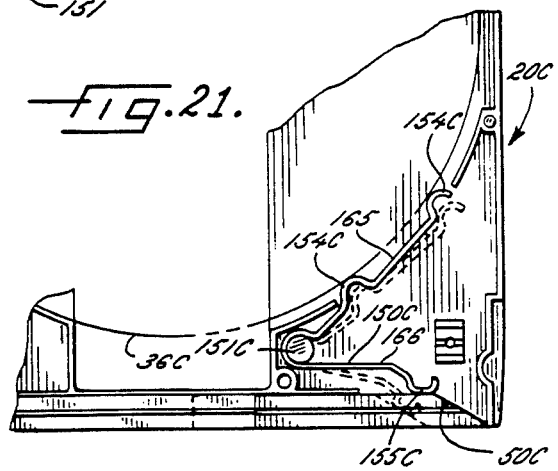
Fig. 21.
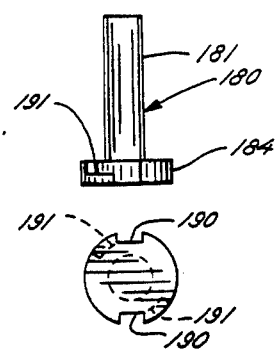
Fig. 22a.
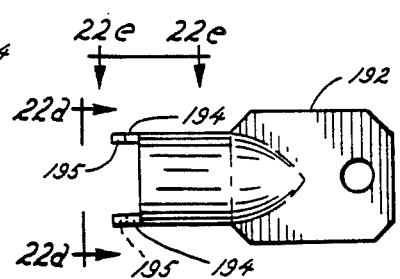
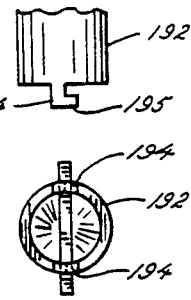
Fig. 22b.    Fig. 22c.    Fig. 22d.

CARTRIDGE FOR OPTICAL DATA DISCS

BACKGROUND OF THE INVENTION

This application is a Division of Ser. No. 120,614, filed Nov. 13, 1987, now Pat. No. 4,908,817 which is a continuation-in-part of application Ser. No. 930,874 filed Nov. 14, 1986 now abandoned.

FIELD OF THE INVENTION

The present invention relates generally to cartridges for compact data information discs. The invention relates more particularly to cartridges of this kind which are optically read and have a sliding door that is opened to permit reading of the disc.

DESCRIPTION OF THE BACKGROUND ART

Compact optical discs (CDs) have been available for some time for recording digitally encoded audio program material such as music. More recently, compact optical discs have been used as a kind of read-only memory (ROM) for mass storage of alphanumeric data to provide computer access to the data. Previously, numerous floppy or hard magnetic discs were required to store a comparable amount of alphanumeric data. It is possible, for example, to store data for an entire set of encyclopedias on a single compact disc.

Compact discs for audio program material typically are stored in a box-like plastic container, and when it is desired to use the disc, it is removed from the container and inserted directly into an optical laser reader. When used for mass data storage, the compact disc is preferably enclosed within a cartridge to prevent the disc from being nicked or scratched during handling. In this situation the cartridge enclosing the disc is inserted into an optical reader. Such cartridges typically have a sliding door which is opened by an actuator arm after the cartridge is inserted in the optical reader.

Because of the multiplicity of relatively movable parts which comprise the cartridge, such cartridges have been relatively expensive to produce, and have experienced problems in usage, particularly with respect to opening and closing of the sliding door. It has not been uncommon for the door to become dislodged from its support track, or become disengaged or deformed, rendering the cartridge unusable.

SUMMARY OF THE INVENTION

The general aim of the present invention is to provide an improved cartridge for optical data discs which provides more reliable operation and lends itself to more economical manufacture.

Another object is to provide an optical data disc cartridge as characterized above which has a more simplified and reliable mounting of the sliding door for the cartridge.

A further object of the invention is to provide an optical data disc cartridge which can be shipped in a partially assembled state, and upon receipt an optical disc can be easily inserted and the assembly operation can be easily completed.

Yet another object is to provide an optical data disc cartridge as characterized above in which the sliding doors are biased into close fitting sliding relation to the sides of the cartridge housing and are maintained in such relation without auxiliary guide or retention means.

Still a further object is to provide an optical data disc cartridge of the above kind in which the doors are less susceptible to deformation and damage during use so as to further enhance the reliable operation of the cartridge.

Another object of the invention is to provide an optical data disc cartridge with a write protection mechanism that can be manually switched from a write inhibit state to a write enable state to permit data to be incrementally added to the disc.

A further object is to provide such an optical data disc cartridge which includes means for automatically engaging and retaining the disc against rattling and abrasive movement during non-use.

Yet another object is to provide a two part optical data disc cartrige assembly in which the parts are secured together by retaining pins that have an aesthetic appearance and which provide added security against unauthorized disassembly of the cartridge.

BRIEF DESCRIPTION OF THE DRAWINGS

Other objects and advantages of the present invention will become apparent upon reading the following detailed description and upon reference to the drawings in which:

FIG. 1 is a perspective view of a first side of a data disc cartridge according to the present invention;

FIG. 2 is a perspective view of a second side of the data disc cartridge shown in FIG. 1;

FIG. 3 is a perspective view of the first side of the data disc cartridge of FIG. 1 showing a sliding door in an open position for exposing the data disc during a read operation;

FIG. 4 is an exploded view of the sliding door and further showing a double coil wire spring for urging the sliding door towards its closed position;

FIG. 5 is an enlarged cross-sectional view of the data disc cartridge when in the plane of line 5—5 in FIG. 1;

FIG. 6 is a cross sectional view of the data disc cartridge taken in the plane of line 6—6 in FIG. 1;

FIG. 7 is an enlarged cross sectional view of the data disc cartridge taken in the plane of line 7—7 in FIG. 3 and showing the door in its open position;

FIG. 8 is an enlarged cross sectional view of the data disc cartridge taken in the plane of line 8—8 in FIG. 3 and further showing a drive spindle engaged for rotating the disc during a read operation;

FIG. 9 is an enlarged cross sectional view of the data disc cartridge taken in the plane of line 9—9 in FIG. 3 and showing an interlocking fastening means joining two shells making up the data disc cartridge;

FIG. 10 is a perspective view of a plug used to lock the interlocking fastening means of FIG. 9 to prevent disassembly;

FIG. 11 is a cross sectional view of the data disc cartridge taken in the plane of line 11—11 in FIG. 3;

FIG. 12 is a perspective view of a lever arm used for selectively closing a write protection hole formed through the data disc cartridge;

FIG. 13 is a cross sectional view taken in the plane of line 13—13 of FIG. 11 and showing the lever arm of FIG. 12 in an open position relative to the write protection hole;

FIG. 14 is a cross sectional view corresponding to FIG. 13 and showing the lever arm of FIG. 12 in a closed position with respect to the write protection hole;

FIG. 15 is a cross sectional view taken in the plane of line 15—15 of FIG. 13;

FIG. 16 is a perspective of a data disc cartridge having an alternative form of sliding door construction;

FIG. 17 is an enlarged, exploded perspective of the sliding door assembly used in the cartridge shown in FIG. 16;

FIG. 18 is a vertical section taken in the plane of line 18—18 in FIG. 17;

FIG. 19 is an enlarged fragmentary section taken in the plane of line 19—19 in FIG. 16, showing the mounting of the sliding door assembly in the illustrated cartridge;

FIG. 20 is a fragmentary view of a modified embodiment of the cartridge having means for automatically engaging and retaining the disc to prevent rattling and abrasive movement of the disc during non-use of the cartridge, one of the shells of the disc being removed for purposes of illustration;

FIG. 21 is a fragmentary view of a cartridge with an alternative embodiment of disc retaining device;

FIG. 22a is an enlarged fragmentary section showing an alternative form of fastening means for releasably securing together the two shells of the cartridge;

FIG. 22b are side and end views of the locking pin used in the fastening arrangement shown in FIG. 22a;

FIG. 22c is a side view of a key adapted for removing the pin from its fastening position shown in FIG. 22a; and FIGS. 22d and 22e are views of the end of the key shown in FIG. 22c taken in the planes of line 22d-22d and 22e-22e, respectively.

While the invention will be described in connection with a certain preferred embodiment, it will be understood that it is not intended to limit the invention to the embodiment shown but, on the contrary, the intention is to cover the various alternative and equivalent constructions included within the spirit and scope of the appended claims.

DETAILED DESCRIPTION OF THE PREFERRED EMBODIMENT

Turning now to FIG. 1, there is shown a perspective view of an optical disc cartridge generally designated 20 according to the present invention. The external shape of the cartridge is largely dictated by a recent adopted industry standard for the five and one-quarter inch (5¼") size optical disc cartridge. This standard was agreed upon by the manufacturers of the optical disc readers, including Phillips Corporation and Sony Corporation.

The compact optical disc has been widely used for recording digitally encoded audio program material such as music. These CD audio discs typically are not enclosed within a cartridge, but rather are handled by their edges and inserted into a slot of an optical reader. In the reader (not shown) a tightly focused laser beam senses the optical reflectivity of the disc as the disc is rotated about its axis. The audio information is usually encoded according to an error-correcting format and circuits are also provided to compensate for any gaps in the digital information which might result from scratches or pitting of the surface of the audio disc. Therefore, for playing a CD audio disc, the disc reader (not shown) can tolerate a considerable amount of corruption of the encoded data due to mishandling of the compact disc.

For recording alphanumeric data for computer processing, a data disc is considered defective if any portion of the data encoded on the disc cannot be faithfully reproduced by the error-correcting circuits. Therefore, the industry has recognized that for storing alphanumeric data on the compact optical discs, the discs should be enclosed within a protective cartridge to prevent the disc from becoming scratched or pitted during handling.

The industry standard for the five and one-quarter inch data disc cartridge specifies that all cartridges meeting the standard must perform certain standard functions. The cartridge 20 has a front portion 21 which has slightly tapered corner side edges 22, 23 to facilitate insertion of the cartridge into a reader (not shown). When the cartridge 20 is fully inserted into the reader, it is held in place by detents 24 formed in the forward side corners 22, 23. Moreover, alignment holes 26, 27 are formed in the cartridge for permitting even more precise orientation of the cartridge with respect to the reader (not shown).

The industry standard specifies that the cartridge 20 is provided with a sliding door generally designated 30 which has a closed position for covering head access apertures 31, 32 formed in the walls of the cartridge 20. The industry standard specifies that for opening the door 30 when the cartridge 20 is inserted into the disc reader, the door 30 is provided with a slot 33 for engaging a pin 34 of a door opening actuator arm 35 provided in the disc reader (not shown). As further illustrated in FIG. 3, the actuator arm 35 is pivoted to open the door 30 and thereby expose the information bearing portion of the disc 36.

The digital information can be written on the disc 36 in a number of different ways, such as photographic, photolithographic, stamping or laser writing methods. The laser writing method enables the disc 36 to be incrementally updated and is also preferred when only a limited number of discs having the same information are required. At the present time it is not possible to erase data from the disc and record over it, although discs having this capability are under development. Therefore, the compact discs having alphanumeric data recorded thereon are sometimes referred to as compact disc read only memory (CD ROM).

For use with discs 36 having a laser write capability, the industry standard specifies that the cartridge 20 has a pair of respective write protect holes 37, 28 which must be blocked to permit writing on the respective "A" side or the "B" side of the disc.

The industry standard also contemplates that a large number of the cartridges 20 might be automatically handled in a fashion analogous to a record juke box. The rear corners of the cartridge 20 are provided with slots 39, 40 to provide for automatic gripping and manipulation of the cartridge, for example, to permit a selected cartridge in a bank of cartridges to be gripped and inserted and retracted from the disc reader (not shown). Moreover, the industry standard specifies that the rear edge portion of the cartridge has eight (8) media sensor holes, four of which generally designated 41 are placed on the right portion of side A of the cartridge, and four of which generally designated 42 are placed on the left portion of side A of the cartridge. The media sensor holes can be selectively blocked to encode an eight-bit binary number which could be used to identify the particular disc cartridge 20.

The present invention concerns a number of features of the disc cartridge 20 which makes it more durable, reliable, and easier to manufacture and assemble. It has been particularly difficult to provide an inexpensive door 30 which will reliably open and close throughout the operating lifetime of the cartridge. The conventional prior art design, for example, requires the door to be made of a single sheet of metal which has a number of folds and has a somewhat irregular shape. Due to the number of folds and irregular shape, the prior art door is relatively expensive to manufacture and results in an excessive amount of scrap metal. The prior art door also has a tendency to become jammed or broken loose from the cartridge when exposed to rough handling.

In accordance with an important aspect of the present invention, the protective cartridge 20 for the data information disc 36 is provided with a door which comprises a slider 50 and a pair of shutters 51, 52. The body of the cartridge 20 is formed by a pair of interlocking shells 53, 54 which enclose the disc 36. For guiding the slider 50, the slider is engaged in a linear track 55 defined by the shells along a forward edge portion of the cartridge 20. Preferably the shells 53, 54 are injection molded from a durable plastic resin such as polycarbonate, and the slider 50 is injection molded from a plastic resin having low friction properties such as acetal GB. The shutters 51, 52 are preferably stamped from type 302/304 stainless steel, one-half hard temper, having a thickness of about 0.011 to 0.013 inches.

A primary advantage of the door 30 having two metal shutters 51, 52 is that the shutters can be identical and they can be stamped from nearly rectangular pieces of sheet metal so that there is very little metal scrap resulting from the stamping operation. Moreover, in accordance with another important aspect of the present invention, the forward edge portions of the shutters 51, 52 are formed with engaging means for engaging with engaging means formed in the slider 50. The engaging means formed in the shutters 51, 52 include a plurality of resilient hooks formed by stamping apertures in the forward edge portions of the shutters. The engaging means in the slider 50 is in the form of an undercut groove generally designated 57 directed along the forward edge portion of the cartridge 20. When the forward edge portions of the shutters 51, 52 including the engaging means 56 are inserted into the undercut slot 57, the hooks spring apart and are positively retained by the overhanging portion of the slider defining the undercut groove, as is more clearly shown in the cross section in the upper portion of FIG. 5. Moreover, the forward edge portions of the shutters 51, 52 are preferably formed with two right angle bends so that the forward edge portions overlap the slider 50.

To prevent the rear edge portions 60, 61 of the shutters 51, 52 from becoming bent away from the outer faces of the shells, 53, 54, respective shutter retainer strips 58, 59 overlap the rear edge portions of the shutters and are secured to ledges formed in the faces of the respective shells. The overlap is most clearly shown in FIG. 5. Also as shown in FIG. 5, the rear edge portions 60, 61 of the shutters are bent slightly toward the interior of the cartridge 20. Therefore, it is possible to have the shutter retainer strips 58, 59 secured flush with the external faces of the cartridge 20. For the design shown in FIG. 5, the shutter retainer strips 58, 59 are adhesively bonded to the plastic shells 53, 54. Alternatively, the retainer strips 58, 59 could be punched with apertures for staking to short stubs 62, 63 formed in the shells. The shutter retainer strips 58, 59 are preferably made of type 302/304 stainless steel, one-half hard temper, having a thickness of 0.016 and 0.018 inches.

In order to urge the sliding door 30 to its closed position for protecting the information bearing portion of the disc 36, a wire torsion spring generally designated 70 has respective end portions 71, 72 which engage the slider 50 and one of the shells such as the shell 54 as shown in FIG. 4. For closing the sliding door, the prior art disc cartridges have used a wire torsion spring having a single multi-turn coil. Such a spring, however, has not been found to be especially reliable over the expected operating life of the disc cartridge. In particular, it has been found that after a period of time the closing force is no longer a substantially linear function of the position of the door, and also fully close the door due to binding of the spring with shells 53, 54 or slider 50.

In accordance with an important aspect of the invention, the spring 70 includes at least two separate multi-turn cylindrical coils which have axes that are substantially offset from each other. Preferably the torsion spring 70 includes two multi-turn cylindrical coils 74, 75 that are spaced from each other. Therefore, as shown in FIGS. 6 and 7, the spring can operate in a linear fashion without binding as the door moves between its closed position, as shown in FIG. 6, and its open position, as shown in FIG. 7. Each coil of the spring 70 preferably includes four turns, and the spring is preferably includes four turns, and the spring is preferably made from 0.028 inch diameter ASTM music wire.

When the door 30 has been opened to permit the reader (not shown) to access the information bearing portion of the disc 36, the disc is engaged with drive mechanism including a spindle 80 which is driven by a rotary drive 81, as shown in FIG. 8. The spindle 80 and rotary drive 81 are parts of the disc reader (not shown). In order to center the disc 36 with the axis of the spindle 80, the disc 36 is provided with a hub including two annular rings 82, 83 which are made of plastic and are ultrasonically welded to the disc 36. The disc 36, for example, comprises an information recording material (not shown) sandwiched in clear plastic. The annular rings 82, 83 are approximately centered by inner walls 84, 95 of the shells 53, 54. To precisely center the disc 36 on the spindle 80, the spindle 80 is provided with shaft 86 having tapered tip 87 engaging a precisely centered hole in a metal disc 88 affixed to the annular ring 83. To center the disc when reading the opposite side, a second metal disc 89 having a centering hole 90 is mounted in the other annular ring 82. During the reading operation, after the cartridge 20 is fully inserted into the reader, an engaging mechanism (not shown) drives the hub 80 along its axis into engagement with the annular ring 83 so that the disc 36 is centered as the tapered tip 87 engages the hole in the metal disc 88. In order to maintain engagement between the annular ring 83 and the spindle 80, the metal discs 88, 89 are made of a ferromagnetic material such as mild steel which is held by magnetic force into contact with an annular magnet 91 which is adhesively bonded to the spindle 80.

Due to the relative difficulty of manufacturing the disc 36, especially if the information content is manufactured into the disc, it is advantageous to ship the cartridge in a partially assembled formed to the location where the disc 36 is manufactured. This avoids the need for shipping the disc without being enclosed in the protective cartridge, which would require additional packaging and careful wrapping and unwrapping operations. The partial assembly as well as the final assembly after the disc is inserted is greatly facilitated by providing the shells 53, 54 of the cartridge 20 with integral fastening means generally designated 100 in FIG. 2.

The internal construction of the integral fastening means 100 is more clearly shown in FIG. 9. The shell 53 is formed with a pair of protruding and spaced hooks 101, 102 which protrude through a circular aperture 103 in the shell 54. Moreover, the shell 54 is formed to provide an annular ledge 104 in the aperture 103, and when assembled, the hooks 101, 102 are deformed toward each other to fit through the aperture 103 and once inserted spring apart to hook upon the ledge 104. For shipment in a partially assembled form to the location where the disc 36 is inserted, the two forward integral fastening means are fastening in this manner but the two rear integral fastening means are not fastened. To assemble the disc 36 into the partial assembly, the disc is inserted from the rear when the rear portions of the shells 53, 54 are spread apart from each other. After the disc is fully inserted, then the rear integral fastening means are engaged by closing the rear portions of the shells together. Once assembled in this fashion, it is possible to use a pair of needle nose plyers to force the hooks 101, 102 together and thereby unfasten the fasteners.

In accordance with another aspect of the present invention, the integral fastening means are permanently locked in a fastened state by using a plug 105 which is shown separately in FIG. 10. The plug has a central blade portion 106 which is forced between the hooks 101, 102 and is permanently held in place by static friction. In order to improve the external appearance of the finished assembly, the plug 105 includes an annular ring 107 which encircles both of the hooks 101, 102 when the blade portion 106 of the plug is fully inserted between the hooks.

As noted above, the industry standard specifies that the optical disc cartridge 20 has write protect holes 37, 38. Write protect holes have been used on computer tape cartridges and such cartridges have been provided with manually slideable shutters having detent positions for selectively opening and closing the write protect holes. The shutter, then, operates similar to a slide switch.

In accordance with another aspect of the present invention, the optical disc cartridge 20 is provided with manually operable pivot arms for selectively blocking and unblocking the write protect holes. The use of a pivot arm rather than a sliding shutter permits the assembly of such a device into the restricted area available in the optical disc cartridge. As shown in FIGS. 13 and 14, the available area is limited to a relatively small triangular region bounded by the information carrying portion of the disc 36, the media sensor holes 42, the juke box gripper slot 40, and the alignment holes 27. Moreover, some of this area is restricted by the integral fastening means 100. The available space, however, is nearly fully used by the pivot arm 110.

The pivot art 110 is separately shown in FIG. 12. It includes an integrally formed pivot shaft 111, a shutter portion 112, a detent engaging means 113, and a tab 114. When assembled as shown in FIG. 11, the integrally formed shaft 111 on the pivot arm 110 becomes engaged in cylindrical pockets formed in the shells 53, 54 during assembly so that the pivot arm is pivotally mounted between the shells. The tab 114 is disposed in an arcuate slot 115 formed in the shell 53 as seen in FIGS. 1 and 3. Preferably the tab 114 does not protrude above the outer surface of the shell 53, but it can be manually manipulated by a stylus or the point of a ball point pen.

In order to maintain the pivot arm in either an open position or a closed position with respect to the write protect hole 37, there is provided an arcuate ridge 116 on the interior surface of the shell 54 and the detent engaging means 113 of the pivot arm 110 rides upon this arcuate ridge. As shown in FIGS. 13, 14 and 15, the arcuate ridge 116 is provided with two detent depressions 117, 118 which engage the detent engaging means 113 when the pivot arm 110 is pivoted to either its open position (FIG. 13) or closed position (FIG. 14) with respect to the write protect hole 37. The engagement of the detent engaging means 113 and either of the detents 117, 118 is specifically illustrated in FIG. 15. The engaging means 113 is pressed with a certain engaging force into either of the depressions 117, 118 by resilient deflection of the pivot arm 110, as shown in FIG. 11. In order to provide for this deflection, the pivot arm 110 is formed with a groove 119 spaced from the integral pivot shaft 111.

Referring now to FIGS. 16–19, there is shown an optical disc cartridge having an alternative form of sliding door assembly wherein parts similar to those described above have been given similar reference numerals with the distinguishing suffix "a" added. The cartridge 20a is formed by a pair of interlocking shells 53a, 54a which are identical to those described above and similarly contain a data disc 36a. A sliding door 30a is mounted on the cartridge for relative sliding movement between a closed position covering reading head access apertures formed in the respective shells 53a, 54a and an open position which permits access to the disc 36a for reading, again as explained previously.

In accordance with a further feature of the invention, the sliding door 30a has a two-part molded construction comprising a pair of separate shutters each having a flat planar portion overlapping a respective one of the shells and an integrally formed forward portion which includes means for positively connecting the shutters together to form a unitary door structure and means for supporting the door structure for sliding movement relative to the shells. To this end, the sliding door 30a comprises a pair of separate and distinct shutters 51a, 52a which each have an integrally formed slider 121, 122 at the forward end thereof. The shutters 51a, 52a preferably are made of a durable plastic resin material, such as acetal. For forming the shutters 51a, 52a into a unitary door structure, means are provided for positively coupling the sliders 121, 122 together, which in this case, comprise innerfitting pins 124 and apertures 125 formed in the sliders of the respective shutters, which may either be press fit into positive engaging relation, or adhesively bonded together. The pins 124 in the illustrated embodiment extend inwardly from forward and rearward portions of the slider 122 and the pin receiving apertures 125 are formed in forward and rearward portions of the slider 121.

For supporting the door 30a for sliding movement relative to the shells 53a, 54a of the cartridge, the sliders 121, 122 each are formed with outwardly facing grooves 128, 129, respectively, in their forward and rearward portions that are engageable with a respective linear track 55a defined by the cartridge shells 53a, 54a. To permit access to the tract receiving grooves 128, 129 during assembly of the door structure, the rearward portion of each slide extends rearwardly of the shutter and each shutter is formed with a cutout area 130, 131 adjacent the forward slide portion. To minimize material requirements and reduce the mass and weight of the shutters 51a, 52a, the sliders 121, 122 each are formed with a central relief area 134 which in effect separates the forward and rearward shutter portions.

To facilitate opening of the door 30a when the cartridge 20a is inserted into a disc reader, the sliders 121, 122 each are formed with a slot or recess 33a which are disposed in aligned relationship for engaging the operating pin of a door opening actuating arm provided in the disc reader, as previously described. For urging the sliding door 30a to its closed position for protecting the information bearing portion of the disc 36a following reading, the slider 122 in this instance is formed with an aperture 138 (FIG. 19) for receiving an end 71a of a wire torsion spring 70a. The end 71a of the torsion spring 70a can be inserted into the aperture 138 prior to assembling the sliders 121, 122, together, such that the opposing slider 121 retains the end 71a of the spring in mounted position.

In accordance with a further feature of the invention, the shutters 51a, 52a each depend from its respective slider 121, 122 at an angle such that when in mounted position the rearwardly extending shutter portions are inclined inwardly toward the sides of the cartridge shells 53a, 54a so that they maintain close fitting relation to the sides of the cartridge without auxiliary guide or retention means. The shutters 51a, 52a in this case are preformed such that the shutters extend inwardly at an angle $\alpha$ of about $\frac{1}{2}°$ from a plane perpendicular to the plane of the forward end of each slider (FIG. 18). Since the shutters are formed of plastic material, upon assembly and mounting of the door 30a the rearwardly extending ends of the shutters are biased into engaging relation with the outwardly exposed sides of the respective shells 53a, 54a. To facilitate relative movement between the inwardly biased ends of the shutters and the sides of the shells, the inner faces of the shutters 51a, 52a each are formed with a linear bead or rib 141, 142 adjacent their rearward end which rides against the side of the respective cartridge shell.

It will be appreciated that the shutters 51a, 52a and their integrally formed sliders 121, 122 may be economically produced by plastic injection molding procedures and are relatively easy to assemble. Since the shutters are made of plastic, they also are less susceptible than metal doors to denting or permanent deformation, which can impede or prevent their opening and closing movement.

Referring now to FIG. 20, there is shown an alternative embodiment of the cartridge that includes means for automatically engaging and retaining the optical data disc from rattling and abrasive movement during periods of non-use. Items similar to those described previously have been given similar reference numerals with the distinguishing suffix "b" added. The cartridge 20b in this instance includes a locking lever 150 mounted for pivotal movement on a pin 151 integrally formed an one of the cartridge shells 54b. The lever 150 includes a disc engaging head 152 at one end having a face 154 shaped in substantial conformity to the outer circumference of the disc 36b and a cam follower arm 155 formed at the opposite end. The head 152 of the locking lever 150 is biased toward a disc engaging position by a spring 156 interposed between the rear side of the head 152 and a ledge 158 integrally formed in one of the cartridge shells 54b.

When the cartridge is not in use and the sliding doors of the cartridge are in there closed position, the door slider 50b, or end of the door, is in a retracted position, as shown in solid lines in FIG. 20. In such position, the cam follower arm 155 of the lever 150 extends beyond the end of the slider 50b and is moved into an opening 160 formed in the slider track under the biasing force of the spring 152 acting on the opposite end of the lever. The head 132 is thereby permitted to be forced into engagement with the disc 36b, so as to prevent the disc from rattling or being damaged through abrasive movement within the cartridge.

Upon opening of the cartridge doors during insertion of the cartridge into a disc reader with the door actuator engaging the slot 33b in the door slider 50b, an end of the slider 50b will engage the arm 155 of the locking lever 150 and cause it to be moved inwardly into the cartridge to the position shown in phantom in FIG. 20, as the slider 50b moves to the door open position, which is a far left hand position in the cartridge, as viewed in FIG. 20. Such camming movement of the arm 155 pivots the locking lever 150 about the pin 151, moving the head 152 to a retracted position out of engagement with the disc, also shown in phantom, so as to permit the disc to be freely rotated during usage. Upon removal of the cartridge from the disc reader and return of the door to its closed position, the cam follower arm 155 of the locking lever 150 will be again permitted to be moved into the guide track slot 160 under the biasing force of the spring 156 returning the head 152 to its disc engaging position. To facilitate camming action between the slider 50b and arm 155 of the locking lever 150, the arm 155 is oriented at an angle to the end of the slider so as to define an inclined camming surface and the end of the slider 50b is formed with an inclined camming surface 162.

Referring now to FIG. 21, there is shown an alternative embodiment of a disc retaining device, wherein items similar to those discussed previously have been given similar reference numerals with the distinguishing "c" added. In this embodiment, the disc retaining device comprises a one piece spring member 150c formed in a generally L-shaped configuration and disposed for pivotal movement around about a pin 151c. The spring member 150c includes one leg 165 adapted for engaging the disc and a second leg 166 that serves as a camming arm which is movable in response to movement of the door slider 50c between opened and closed positions. The disc engaging leg 165 of the spring 150c in this case is formed with a pair of spaced apart dimples 154c for engaging the disc 36c at two pressure points. The second leg 166 of the spring member 150c is formed with a dimple 155c that cooperates with the door slider 50c. When the door is moved to its closed position, the right end of the slider 50c, as viewed in FIG. 21, is moved into engagement with the camming dimple 155c of the spring member 150c causing the spring member to pivot about the pin 151c so as to move the disc engaging dimples 154c of the spring member into firm contact with the disc. When the disc door is moved to its open position, the slider 50c is moved to the left, as viewed in FIG. 21, which permits the spring member 150c to pivot to a retracted position, as shown in phantom, with the disc engaging dimples 154c removed from the disc.

Referring now to FIGS. 22a–22e, there is shown an alternative means for releasably fastening the shells of the cartridge together, which has an aesthetic clean appearance and provides added security against unintended disassembly of the cartridge. The cartridge shell 54d in this instance is formed with an annular inwardly extending locking member 170 having an internal aperture 171 for releasably receiving hooks 172 extending inwardly from the other cartridge shell 53d. The hooks 172 are formed with radially facing ledges 174 that are adapted for positive engagement within radial recesses 175 formed in the internal walls of the annular locking member 170. To facilitate snap action insertion and removal of the hooks 172, the ledges 174 are formed with inclined upper and lower camming surfaces, and the recesses 175 of the locking member are complimentary shaped. For retaining the shells in engaged condition, a pin 180 having a shank 181 is press fit into an aperture 182 defined by the hooks 172 so as to prevent inward movement of the hooks necessary for removing the hooks from the locking member 170. The pin 180 preferrably has a head 184 with a smooth outer periphery which is positionable in a recess 185 formed in the shell 54d so that the outer face of the pin is substantially co-planer with the outer face of the shell.

In keeping with a further feature of the invention, for providing security against unauthorized disassembly of the cartridge, the pin head is formed with undercut notches which requires a special key to effect removal. For this purpose, a pair of small notches 190 extend through the head 184 on diametrically opposed sides of the head. Communicating with each notch 190 is an undercut section 191 which defines a hidden key way adjacent one side of the notch on the underside of the head 184. For effecting removal of the pin in the event it is desired to disassemble the cartridge shells 53d, 54d, a special key 192 may be provided, such as illustrated in FIGS. 22c–e, which has a pair of depending teeth 194 that are positionable into the diametrically opposed notches 190. Each tooth 194 has a generally L-shaped configuration so as to define a sidewardly extending hook 195. Upon positioning of the teeth 194 in the notches 190, the key may be turned in a counter-clockwise direction relative to the end face of the pin, as viewed in 22b, so as to position sidewardly extending hooks 195 of the L-shaped teeth into the undercut recesses 191. In such position, the hooks 195 will engage the underside of the head in the undercut recesses so as to enable the pin to be pulled from the aperture 182.

It will be appreciated that without the special key 192, the pin 180 is not easily removable from the its assembled position in the cartridge shells. Moreover, since the undercut sections 191 are not visible when the pin is in its assembled condition, it is not apparent what type of device could best be used for effecting removal of the pin. It will be understood that in the event it is necessary or desirable to use some other type of fastener for retaining the cartridge shells in assembled condition, the aperture 182 formed in the hooks 172 could receive a self-tapping screw or the like, which would similarly prevent inward deflection of the hooks from their assembled position, even though such other type fastener might not provide the added security against unauthorized disassembly of the cartridge.

In view of the above, an optical data disc cartridge has been described which provides more reliable operation and lends itself to more economical manufacture. The sliding door includes two separate metal shutters which are less expensive to manufacture and which permanently engage a slider. A double coil torsion spring ensures a linear closing force for the door over its entire range of travel. The shells forming the cartridge include integral fastening means which very quickly snap together and which are permanently locked by plugs. Also, a manually operable pivot arm has been described for selectively blocking or unblocking a write protect hole, detent means are provided for maintaining the pivot in either its open or closed state with respect to the write protect hole, and alternative means can be utilized for positively retaining the disc against movement when the cartridge is not being used.

We claim as our invention:

1. A protective cartridge for a data information disc comprising a pair of interlocking shells enclosing said disc, a sliding door movable from a closed position for covering said disc to an open position for exposing said disc during a read operation, said door including a pair of shutters each having a flat planar portion overlapping a respective one of the shells, a slide separate from said shutters upon which said shutters are mounted, and said slide having an outer periphery and said shells having a portion internally within said cartridge which together define a cooperating guide track and groove for supporting said slide and the shutters mounted thereon and for guiding their movement relative to said shells.

2. The protective cartridge of claim 1 in which said shutters are separate parts individually secured to said slide.

3. The protective cartridge of claim 1 in which said slide is made of plastic.

4. The protective cartridge of claim 3 in which said shutters are made of metal.

5. A protective cartridge for a data information disc comprising a pair of interlocking shells enclosing said disc, a sliding door movable from a closed position for covering said disc to an open position for exposing said disc during a read operation, said door including a non-metallic slide and a pair of metallic shutters carried by said slide, said shutters each having a flat planar portion overlapping a respective one of the shells, and said slide having an outer periphery and said shells having a portion internally within said cartridge which together define a cooperating guide track and groove for supporting said slide and the shutters carried thereby and for guiding their movement relative to said shells.

6. The protective cartridge of claim 5 in which said shutters are separate parts individually secured to said slide.

7. A protective cartridge cartridge for data information disc comprising a pair of interlocking shells enclosing said disc, a sliding door movable between a closed position for covering said disc and an open position for exposing said disc during a read operation, said shells defining a track internally within said cartridge along a forward edge portion of said cartridge, said door including a pair of shutters each having a flat planar portion overlapping a respective one of the shells, a slide separate from said shutters upon which said shutters are mounted, and said slide having an outer periphery formed with a groove for receiving said track whereby said slide and the shutters mounted thereon are supported for sliding movement relative to said shells.

8. The protective cartridge of claim 7 in which said shutters are separate parts individually secured to said slide.

9. The protective cartridge of claim 7 in which said slide is made of plastic.

10. The protective cartridge of claim 9 in which said shutters are made of metal.

11. The protective cartridge of claim 1 in which said shells each have an internal portion formed with a guide track, and said slide is formed with grooves on opposite sides thereof for receiving said guide tracks.

12. The protective cartridge of claim 1 in which said slide is a block-like member.

13. The protective cartridge of claim 5 in which said shells each have an internal portion formed with a guide track, and said slide is formed with grooves on opposite sides thereof for receiving said guide tracks.

14. The protective cartridge of claim 7 in which said shells each have an internal portion formed with a guide track, and said slide is formed with grooves on opposite sides thereof for receiving said guide tracks.

* * * * *